United States Patent
Bandishte et al.

(10) Patent No.: US 10,846,093 B2
(45) Date of Patent: Nov. 24, 2020

(54) SYSTEM, APPARATUS AND METHOD FOR FOCUSED DATA VALUE PREDICTION TO ACCELERATE FOCUSED INSTRUCTIONS

(71) Applicant: Intel Corporation, Santa Clara, CA (US)

(72) Inventors: Sumeet Bandishte, Indore (IN); Jayesh Gaur, Bangalore (IN); Sreenivas Subramoney, Bangalore (IN); Hong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 16/229,502

(22) Filed: Dec. 21, 2018

(65) Prior Publication Data

US 2020/0201644 A1   Jun. 25, 2020

(51) Int. Cl.
   *G06F 9/38*         (2018.01)
   *G06F 12/0875*      (2016.01)
   *G06F 9/30*         (2018.01)

(52) U.S. Cl.
   CPC ........ *G06F 9/3832* (2013.01); *G06F 9/30043* (2013.01); *G06F 12/0875* (2013.01); *G06F 2212/1021* (2013.01)

(58) Field of Classification Search
   CPC .............. G06F 9/30043; G06F 9/3832; G06F 12/0875; G06F 2212/1021
   See application file for complete search history.

(56) References Cited

U.S. PATENT DOCUMENTS

| | | | | |
|---|---|---|---|---|
| 6,438,673 | B1 * | 8/2002 | Jourdan ................. | G06F 9/383 711/213 |
| 7,788,473 | B1 * | 8/2010 | Nelson .................... | G06F 9/383 712/219 |
| 2001/0032308 | A1 * | 10/2001 | Grochowski ....... | G06F 9/30072 712/226 |
| 2005/0216714 | A1 * | 9/2005 | Grochowski ......... | G06F 9/3863 712/240 |
| 2005/0235170 | A1 * | 10/2005 | Atkinson ............. | G06F 1/3225 713/320 |
| 2019/0303163 | A1 * | 10/2019 | Aboud ................ | G06F 9/30058 |

OTHER PUBLICATIONS

Brian Fields, et al., "Focusing Processor Policies via Critical-Path Prediction," 2001, pp. 1-12.
Mikko H. Lipasti, et al., "Value Locality and Load Value Prediction," ASPLOS-VII, Oct. 1996, pp. 1-10.
(Continued)

*Primary Examiner* — Larry T Mackall
(74) *Attorney, Agent, or Firm* — Trop, Pruner & Hu, P.C.

(57) ABSTRACT

In one embodiment, an apparatus includes: a value prediction storage including a plurality of entries each to store address information of an instruction, a value prediction for the instruction and a confidence value for the value prediction; and a control circuit coupled to the value prediction storage. In response to an instruction address of a first instruction, the control circuit is to access a first entry of the value prediction storage to obtain a first value prediction associated with the first instruction and control execution of a second instruction based at least in part on the first value prediction. Other embodiments are described and claimed.

20 Claims, 12 Drawing Sheets

(56) References Cited

OTHER PUBLICATIONS

Arthur Perais, et al., "Revisiting Value Prediction," Nov. 29, 2012, pp. 1-26.
Yiannakis Sazeides, et al., "The Predictability of Data Values," Dec. 1997, pp. 1-12.
U.S. Appl. No. 15/857,863, filed Dec. 29, 2017, entitled "System, Apparatus and Method for Controlling Allocations Into a Branch Prediction Circuit of a Processor," by Ragavendra Natarajan, et al.

* cited by examiner

US 10,846,093 B2

SYSTEM, APPARATUS AND METHOD FOR FOCUSED DATA VALUE PREDICTION TO ACCELERATE FOCUSED INSTRUCTIONS

TECHNICAL FIELD

Embodiments relate to performing value prediction in a processor.

BACKGROUND

Modern superscalar processor performance is limited by control flow dependencies and slow memory. As processor speed and size grows, control dependencies and memory slowness become increasing barriers to enhancing instructions per cycle. Branch prediction and memory prefetching are traditional techniques used to address these issues. However, the accuracy and coverage of these techniques continue to restrict performance.

DETAILED DESCRIPTION

In various embodiments, techniques are provided for performing focused data value prediction to accelerate execution of certain instructions in an out-of-order processor. More specifically, embodiments may perform value prediction for only a small subset of instructions that feed data into instructions of certain types. In embodiments these instructions include load instructions that miss caches very close to retirement, which cause a pipeline stall. Such loads are termed delinquent loads. Similarly, hard-to-predict (H2P) branch instructions that mis-predict close to retirement are detrimental to performance, since the penalty of flushing is very high. By predicting instructions that feed into these particular and limited load/branch instructions, an early speculative execution of these instructions is facilitated. The early execution allows resolution of a cache miss or a branch mis-prediction while it is still far from retirement, hence avoiding/reducing pipeline stalls.

Focused data value prediction in accordance with an embodiment of the present invention targets only a minimum subset of instructions that can help calculate the address of a delinquent load or the target of the H2P branch. The instructions that produce the sources of the delinquent load/H2P branch may be iteratively determined, and the predictability of those instructions may be learned. If the instruction is not predictable, embodiments continue to determine whether the sources of that instruction can be value predicted. As soon as an instruction is found that is value predictable, this iterating stops and this instruction is recorded for value prediction. This process helps to identify a minimum set of instructions that can help speed up the delinquent load/H2P branch instruction. For a small value prediction table, focused data value prediction in accordance with an embodiment may give three times more performance than general value prediction.

Figure 1:
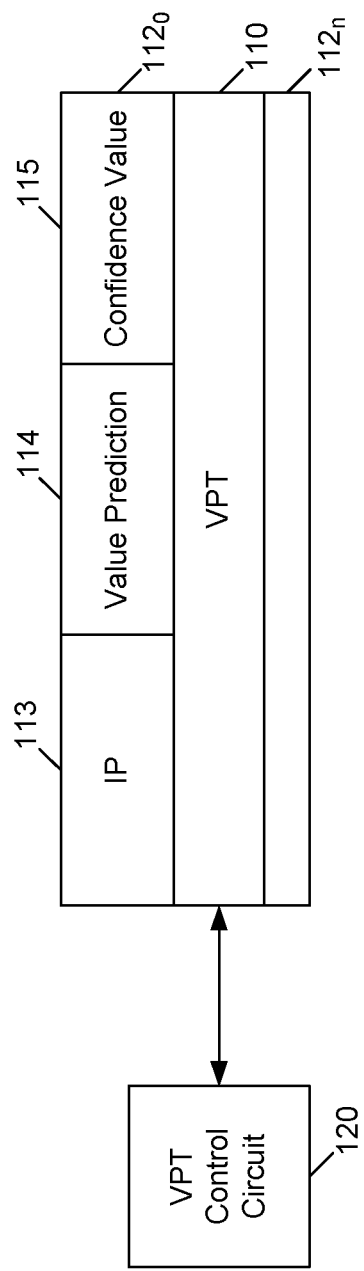
FIG. 1 is a block diagram of a value prediction circuit in accordance with an embodiment of the present invention.

Referring now to FIG. 1, shown is a high level block diagram of a value predictor in accordance with an embodiment of the present invention. More specifically, value predictor 100 in FIG. 1 may be implemented as a hardware circuit that is used to identify and maintain information regarding value predictions for certain instructions. As described herein, these instructions may include load instructions that miss late within a pipeline of the processor and H2P instructions, collectively generally referred to herein as "focused instructions," and feeder instructions to such focused instructions. Of course in other embodiments, many other instruction types may be suitable for value predicting as described herein. Nevertheless, for purposes of discussion and for implementation of a value predictor that consumes relatively little chip area, these two types of focused instructions will be primarily addressed herein.

As illustrated, value predictor 100 includes a value prediction table 110 including a plurality of entries $112_0$-$112_n$. As seen, each entry 112 includes various fields, including an instruction pointer field 113 that is configured to store at least a portion of an address of an instruction of interest. A field 114 is configured to store a value prediction, namely a predicted result for the instruction, which may be determined as described herein. In turn, a field 115 is configured to store a confidence value corresponding to confidence information associated with this value prediction. In an embodiment, the confidence value may be implemented using a saturating counter, e.g., a saturating four-bit counter to maintain a count with regard to correct predictions of the value of the instruction.

As illustrated, value prediction table 110 couples to a value prediction table control circuit 120. In embodiments, control circuit 120 may be implemented as a hardware circuit configured to control allocations and evictions of entries of value prediction table 110, and maintenance and updating of information within the entries. Still further, value prediction table control circuit 120 may control access to information within value prediction table 110 and may identify, based on various incoming information, when to allocate an entry for a given instruction of interest into value prediction table 110. Still further, control circuit 120 may be configured to determine when it is appropriate to use a value prediction from a given entry within value prediction 110 for purposes of providing source information for a given instruction, as described herein. Understand while shown at this high level in the embodiment of FIG. 1, many variations and alternatives are possible.

Figure 2:
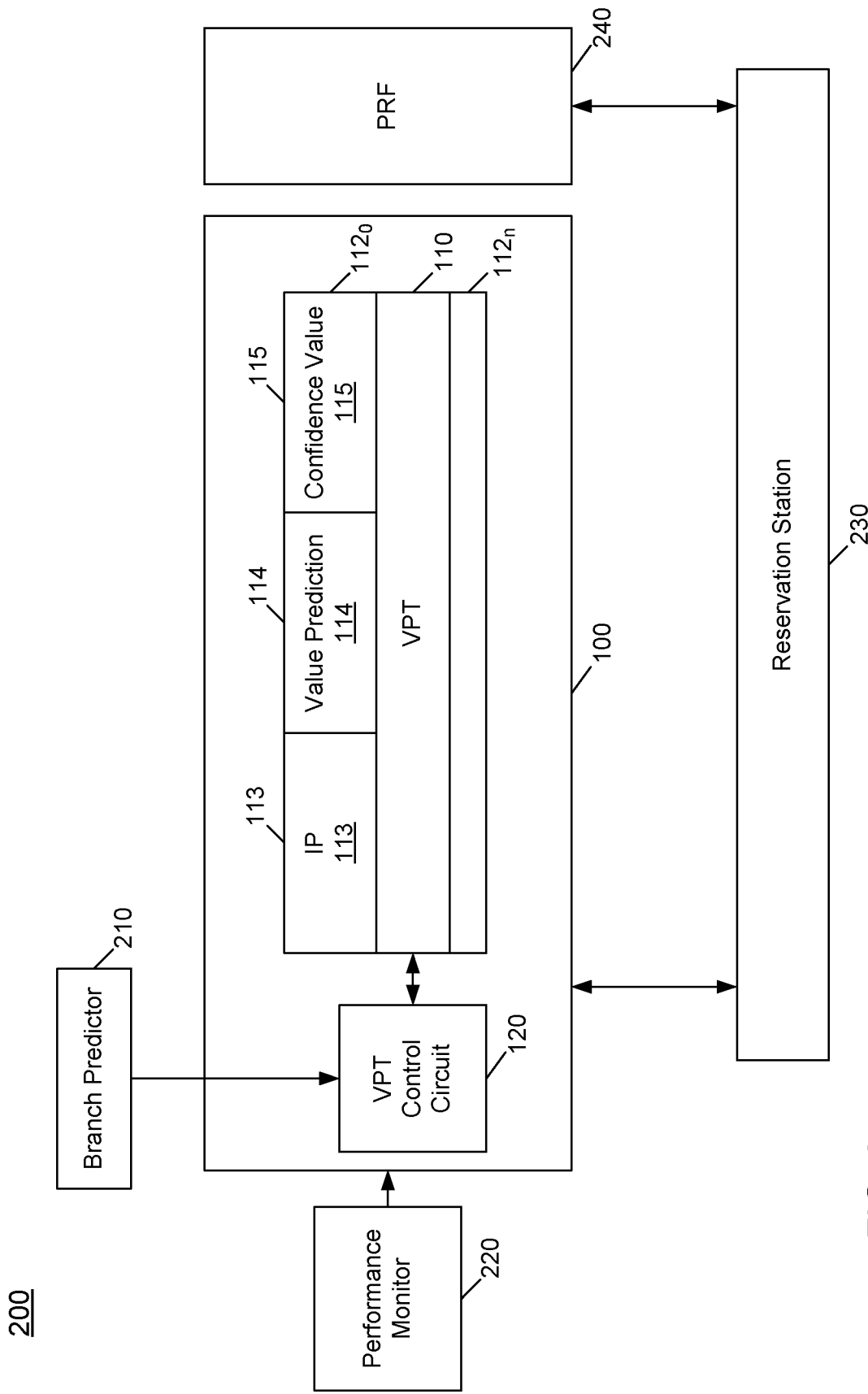
FIG. 2 is a block diagram of a portion of a processor in accordance with an embodiment.

Referring now to FIG. 2, shown is a block diagram of a portion of a processor in accordance with an embodiment. More specifically, FIG. 2 shows an interaction between a value predictor as described herein and other processor circuitry. Understand however that additional components and circuitry may be present in embodiments, and different configurations of the components shown in FIG. 2 also are possible.

In the high level of FIG. 2, processor 200 includes a value predictor 100, e.g., implemented as discussed above in FIG. 1. Also shown in FIG. 2 are components that provide information to value predictor 100, including a branch predictor 210 and a performance monitor 220. In embodiments, branch predictor 210 may be implemented with any type of appropriate prediction technology to provide information regarding branch instructions. For purposes of use in value prediction table 100, branch predictor 200 may identify certain instructions as H2P instructions. When a given instruction is identified to value predictor 100 as an H2P instruction, value prediction table control circuit 120 may allocate an entry in value prediction table 110 for this instruction. More particularly, in an embodiment when a focused instruction is an H2P branch, the H2P branch is not added to value prediction table 110 but only its sources. For delinquent load instructions, both the delinquent load instruction and its source instruction(s) are added to value prediction table 110. Still further, value prediction table control circuit 120 may identify one or more source instructions for this H2P instruction and similarly allocate entries within value prediction table 110 for these instructions. To this end, control circuit 120 may be in communication with a reservation station 230 or other scheduling circuitry to identify such source or feeder instructions.

As further illustrated in FIG. 2, performance monitor 220 is in communication value predictor 100. Performance monitor 220 is a hardware circuit within a processor that may maintain various performance monitoring information, including statistics regarding executed instructions, stall information or so forth. With this information, control circuit 120 may identify load instructions that miss late in a pipeline, e.g., close to retirement, causing processor stalls and other adverse effects. In response to an indication of this type of load instruction, control circuit 120 may allocate an entry within value prediction table 110 for this load instruction, along with its feeder instructions, as described above.

As further described herein, a value prediction of value prediction table 110 for a given feeder instruction may be used for execution of a dependent instruction. In this instance, value predictor 100 may provide this value prediction to reservation station 230 to be used as a source for the dependent instruction. And to this end, this corresponding source of the dependent instruction is set and a dependency indicator is removed for the given source instruction.

As further illustrated in FIG. 2, value prediction table 110 may be implemented as an adjunct to a physical register file 240. Physical register file 240 may include a large set of physical registers to which a set of architectural registers may be renamed, as identified in corresponding entries within reservation station 230. Understand while shown at this high level in the embodiment of FIG. 2, many variations and alternatives are possible.

Figure 3A:
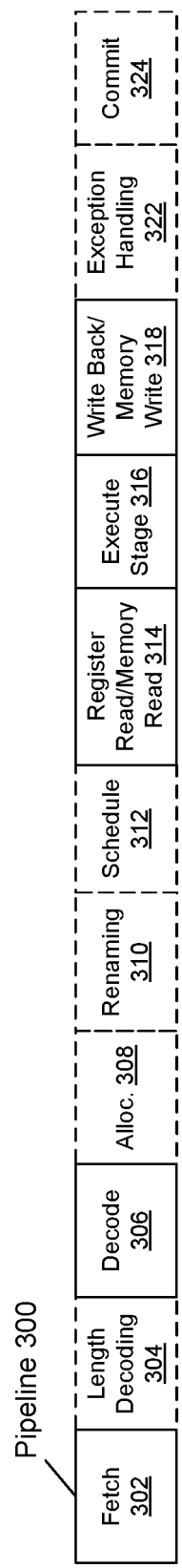
FIG. 3A is a block diagram illustrating an in-order pipeline and a register renaming stage, out-of-order issue/execution pipeline according to at least one embodiment of the invention.
Figure 3B:
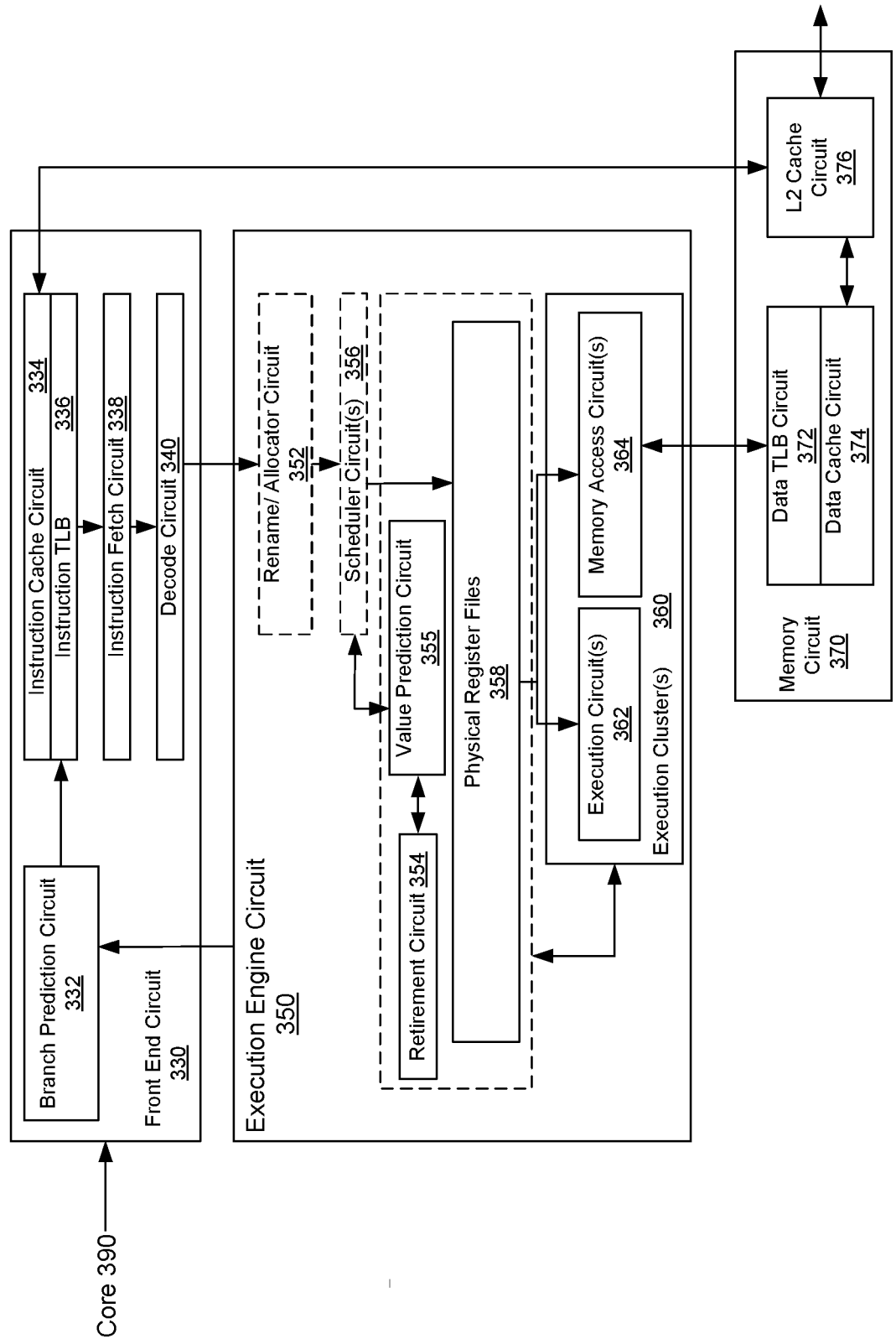
FIG. 3B is a block diagram illustrating an in-order architecture core and a register renaming logic, out-of-order issue/execution logic to be included in a processor according to at least one embodiment of the invention.

FIG. 3A is a block diagram illustrating an in-order pipeline and a register renaming stage, out-of-order issue/execution pipeline according to at least one embodiment of the invention. FIG. 3B is a block diagram illustrating an in-order architecture core and a register renaming logic, out-of-order issue/execution logic to be included in a processor according to at least one embodiment of the invention. The solid lined boxes in FIG. 3A illustrate the in-order pipeline, while the dashed lined boxes illustrate the register renaming, out-of-order issue/execution pipeline. Similarly, the solid lined boxes in FIG. 3B illustrate the in-order architecture logic, while the dashed lined boxes illustrate the register renaming logic and out-of-order issue/execution logic.

In FIG. 3A, a processor pipeline 300 includes a fetch stage 302 which may include a branch predictor as described herein, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324.

In FIG. 3B, arrows denote a coupling between two or more circuits and the direction of the arrow indicates a direction of data flow between those circuits. FIG. 3B shows a processor core 390 including a front end circuit 330 coupled to an execution engine circuit 350, and both are coupled to a memory circuit 370.

The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, graphics core, or the like.

The front end circuit 330 includes a branch prediction circuit 332 coupled to an instruction cache circuit 334, which is coupled to an instruction translation lookaside buffer (TLB) 336, which is coupled to an instruction fetch circuit 338, which is coupled to a decode circuit 340. Branch prediction circuit 332 may include local and global predictors to predict branch instructions and provide information regarding such predictions (e.g., taken or not taken) to instruction TLB 326.

Decode circuit 340 may decode instructions, and generate as an output one or more micro-operations, micro-code entry points, micro-instructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. Instruction cache circuit 334 is further coupled to a level 2 (L2) cache circuit 376 in the memory circuit 370. Decode circuit 340 is coupled to a rename/allocator circuit 352 in the execution engine circuit 350.

Execution engine circuit 350 includes the rename/allocator circuit 352 coupled to a retirement circuit 354 and a set of one or more scheduler circuit(s) 356. The scheduler circuit(s) 356 represents any number of different schedulers, including reservations stations, central instruction window, etc. The scheduler circuit(s) 356 is coupled to the physical register files 358. Each of the physical register files 358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register files 358 are overlapped by the retirement circuit 354 to illustrate various ways in which register renaming and out-of-order execution may be implemented (e.g., using a reorder buffer(s) and a retirement register file(s), using a future file(s), a history buffer(s), and a retirement register file(s); using a register map and a pool of registers, etc.). As further illustrated, execution engine circuit 350 also includes a value prediction circuit 355 in accordance with an embodiment. By leveraging a value prediction determined in value prediction circuit 355, one or more sources of a dependent instruction, such as the described cache missing load instructions and H2P instructions, may be obtained and used for earlier speculative execution of these instructions.

As shown in FIG. 3B, understand that in some cases, a value prediction table of value prediction circuit 355 may be located in close association such as an adjunct of physical register files 358, as described above.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc.

The retirement circuit 354 and the physical register files 358 are coupled to the execution cluster(s) 360. The execution cluster(s) 360 includes a set of one or more execution circuits 362 and a set of one or more memory access circuits 364. The execution circuit 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler circuit(s) 356, physical register files 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s), and/or execution cluster—and in the case of a separate memory access pipeline, certain embodiments are implemented in which only the execution cluster of this pipeline has the memory access circuit(s) 364). It should also be understood that where separate pipelines are used, one or more of these pipelines may be out-of-order issue/execution and the rest in-order. As illustrated, feedback information may be provided from execution engine circuit 350 to branch prediction circuit 332 and value prediction circuit 333 to provide feedback information, indicating whether instructions were correctly predicted or mispredicted, so that updating of prediction information can occur as described herein.

The set of memory access circuits 364 is coupled to the memory circuit 370, which includes a data TLB circuit 372 coupled to a data cache circuit 374 coupled to a level 2 (L2) cache circuit 376. In one exemplary embodiment, the memory access circuits 364 may include a load unit, a store address unit, and a store data unit, each of which is coupled to the data TLB circuit 372 in the memory circuit 370. The L2 cache circuit 376 is coupled to one or more other levels of cache and eventually to a main memory.

With reference back to FIG. 3A, by way of example, the exemplary register renaming, out-of-order issue/execution core architecture may implement the pipeline 300 as follows: 1) the instruction fetch circuit 338 performs the fetch and length decoding stages 302 and 304; 2) the decode circuit 340 performs the decode stage 306; 3) the rename/allocator circuit 352 performs the allocation stage 308 and renaming stage 310; 4) the scheduler circuit(s) 356 performs the schedule stage 312; 5) the physical register files 358 and the memory circuit 370 perform the register read/memory read stage 314; the execution cluster 360 performs the execute stage 316; 6) the memory circuit 370 and the physical register files 358 perform the write back/memory write stage 318; 7) various circuits may be involved in the exception handling stage 322; and 8) the retirement circuit 354 and the physical register files 358 perform the commit stage 324.

Core 390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.); or possible other ISAs. It should be understood that core 390 may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 334/374 and a shared L2 cache circuit 376, alternative embodiments may have a single internal cache for both instructions and data, such as, for example, a level 1 internal cache, or multiple levels of internal cache. In some embodiments, the system may include a combination of an internal cache and an external cache that is external to the core and/or the processor. Alternatively, all of the cache may be external to the core and/or the processor.

Figure 4:
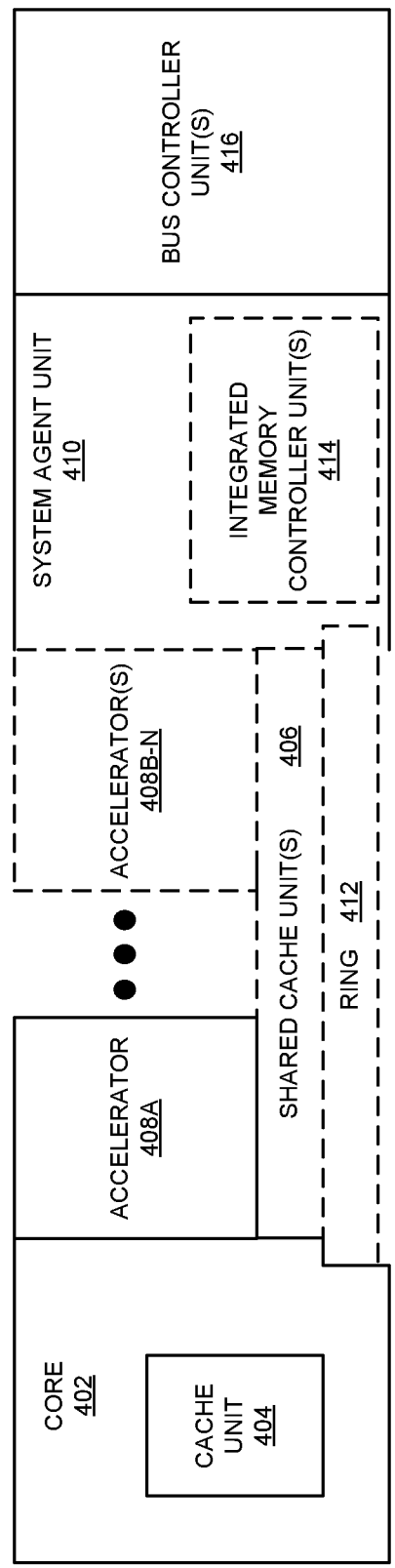
FIG. 4 is a block diagram of a processor with integrated memory controller and accelerator functionality according to embodiments.

FIG. 4 is a block diagram of a processor 400 with integrated memory controller and accelerator functionality according to embodiments. The solid lined boxes in FIG. 4 illustrate a processor 400 with a single core 402, a single accelerator 408A, a system agent unit 410, a set of one or more bus controller units 416, while the optional addition of the dashed lined boxes illustrates an alternative processor 400 with multiple accelerators 408B-N, and a set of one or more integrated memory controller unit(s) 414 in the system agent unit 410. At least core 402 may include a value prediction circuit as described herein.

The memory hierarchy includes one or more levels of cache within the core 402 including a cache unit 404, a set or one or more shared cache units 406, and external memory (not shown) coupled to the set of integrated memory controller units 414. The set of shared cache units 406 may include one or more mid-level caches, such as level 2 (L2), level 3 (L3), level 4 (L4), or other levels of cache, a last level cache (LLC), and/or combinations thereof. While in one embodiment a ring-based interconnect unit 412 interconnects the accelerator(s) 408, the set of shared cache units 406, and the system agent unit 410, alternative embodiments may use any number of well-known techniques for interconnecting such units.

The system agent unit 410 includes those components coordinating and operating core 402 and accelerator(s) 408A-N. The system agent unit 410 may include for example a power control unit (PCU) and a display unit (not shown). The PCU may be or include logic and components to regulate the power state of the core 402 and accelerator(s) 408A-N. The display unit is for driving one or more externally connected displays.

While a single core embodiment is shown for ease of illustration, understand that multiple cores may be present. Such cores may be homogenous or heterogeneous in terms of architecture and/or instruction set. For example, some of the cores may be in-order while others are out-of-order. As another example, two or more of the cores may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 400 may be a part of and/or may be implemented on one or more substrates using any of a number of process technologies, such as, for example, BiCMOS, CMOS, or NMOS.

Figure 5:
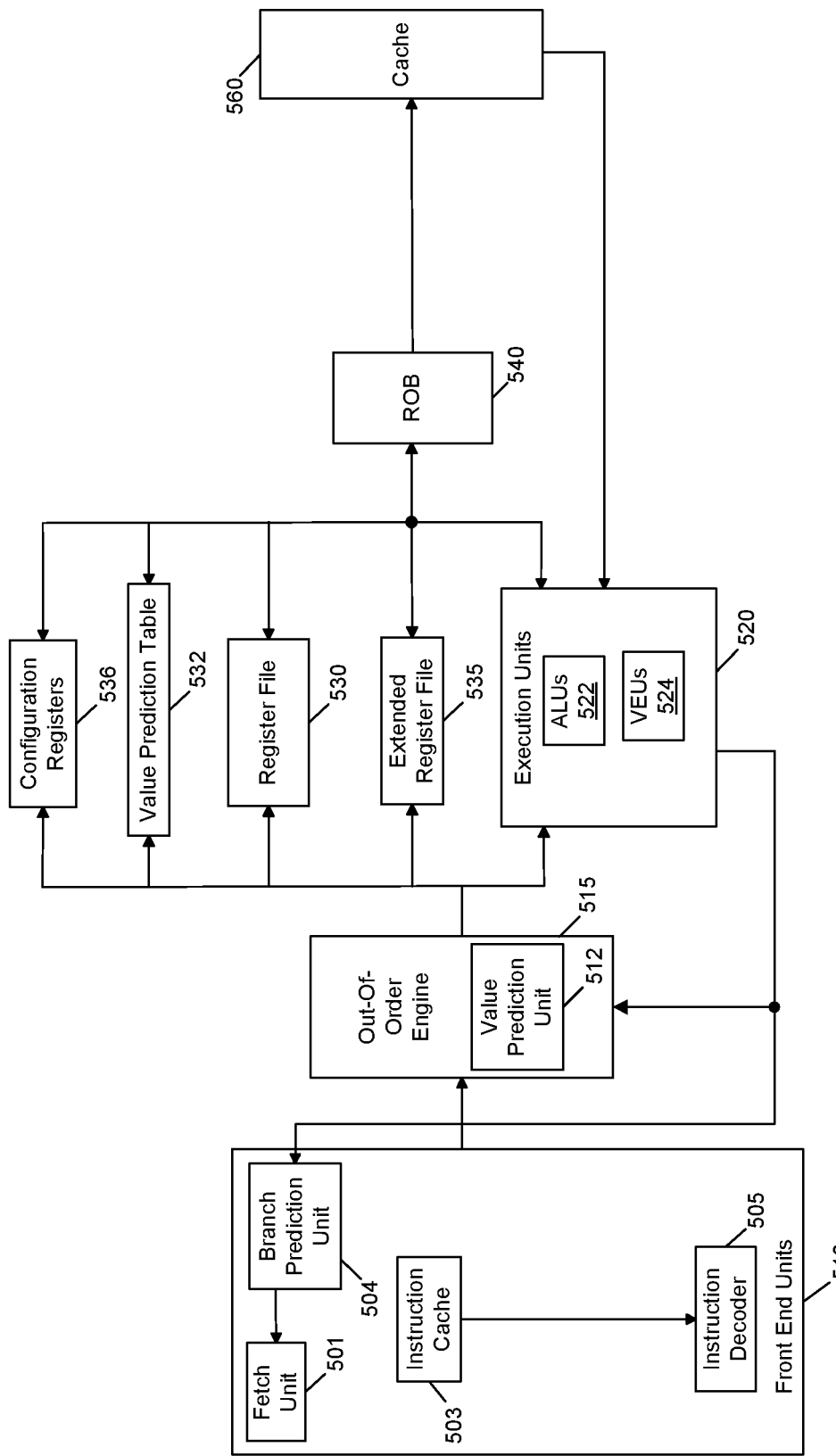
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. Front end units 510 may further include a branch prediction unit 504, to predict branch instructions, with branch decision information provided to fetch unit 501 to direct the next IP to be fetched to obtain instructions for execution within processor 500. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. In addition, a value prediction unit 512 is provided within out-of-order engine 515 to enable value predictions for both a focused set of instructions and for feeder instructions of these instructions to be obtained and used to speculatively execute such focused instructions earlier than otherwise possible, as described herein. As further illustrated, value prediction unit 512 and branch prediction unit 504 may receive feedback information to indicate whether corresponding predictions were correctly predicted or mispredicted in value prediction unit 512 and branch prediction unit 504. Such information may be provided from corresponding execution units 520, described further below.

Register file 530 may include separate register files for integer and floating point operations. Extended register file 535 may provide storage for vector-sized units, e.g., 256 or 512 bits per register. In the embodiment of FIG. 5, note that a value prediction table 532 is shown in close relation to register file 530. Of course, in different implementations the value prediction table may be present in other locations of a core. As further illustrated in FIG. 5, core 500 also includes a set of configuration registers 536, which may include various configuration registers to configure modes of operation and execution within core 500.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 560 which, in one embodiment may be a low level cache (e.g., an L1 cache), although the scope of the present invention is not limited in this regard. As further shown in FIG. 5, execution units 520 can be directly coupled to cache 560. From cache 560, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
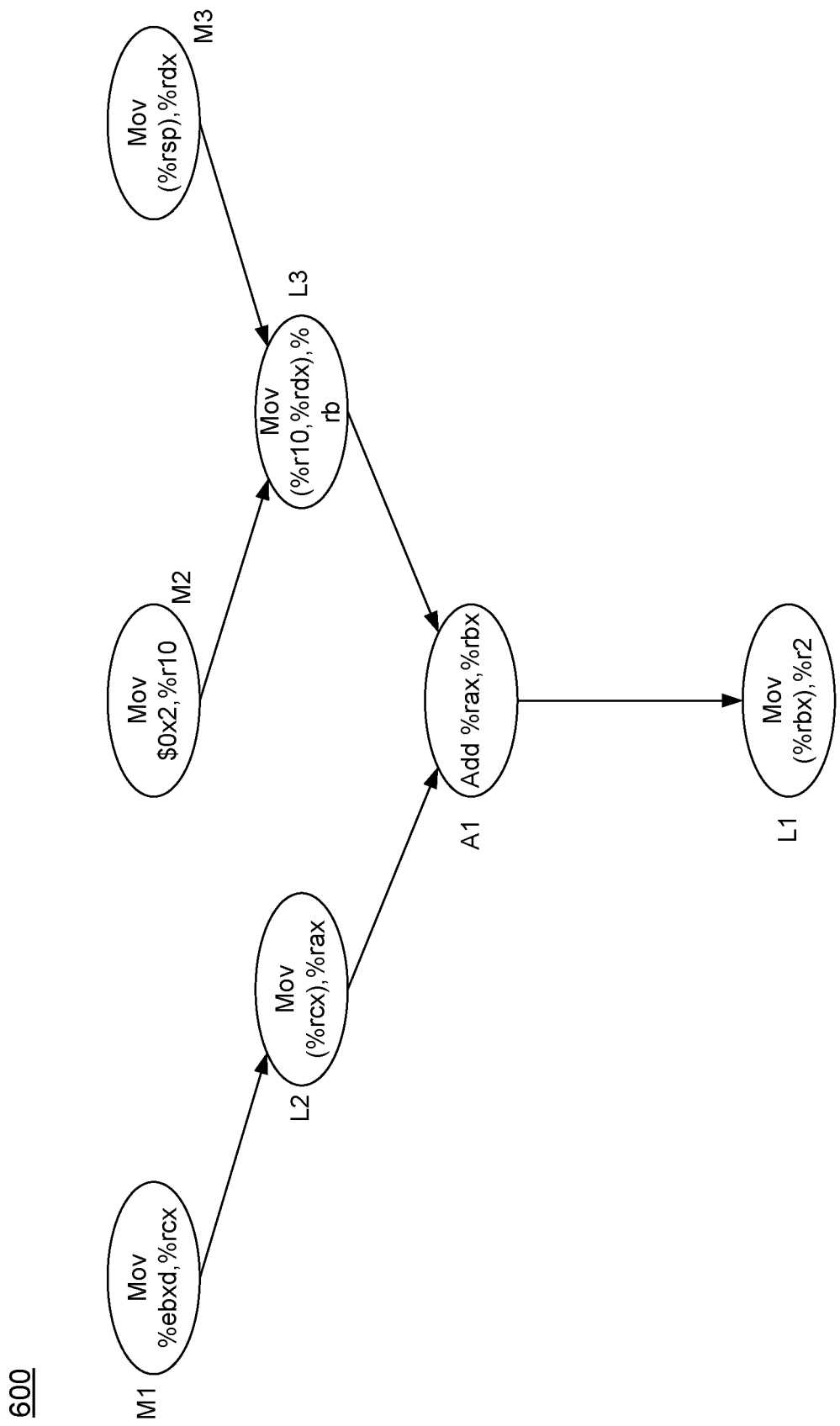
FIG. 6 is a graphical illustration of a dependence chain for an instruction which may be present in code of any type of application.

Referring now to FIG. 6, shown is a graphical illustration of a dependence chain for an instruction which may be present in code of any type of application. As illustrated in FIG. 6, note the presence at the bottom of dependence chain 600 of a load instruction L1. As seen the source address for this load instruction is computed using a register value (% rbx). In turn, this register value is fed by a source or feeder instruction A1, namely an add instruction. As seen, this add instruction is fed in turn by two separate chains of instructions. Each independent chain of instructions to add instruction A1 feeds one of the sources of the add instruction.

As illustrated on the left hand side of dependence chain 600, a first source (% rax) is obtained with another load instruction (L2) that in turn is dependent on another instruction M1, namely another load instruction. In turn, a second source of add instruction A1 (% rbx) is obtained from another load instruction L3. In turn, load instruction L3 is dependent on feeder instructions M2 and M3. With this illustration of dependence chain 600, program order mandates that load instruction L1 waits until all instructions in the feeder chain are executed, which delays the load. If an instruction in the feeder chain can be value predicted, then the load can be launched faster. Note that prediction need not occur for all instructions of the dependence chain. For example, if add instruction A1 is predictable, load instruction L1 can execute as soon as it allocates to an OOO engine and issues a cache request without waiting. In contrast, if load instructions L2 or L3 were predicted, L1 still is to wait for add instruction A1 to execute before it can proceed. Predicting instructions farther up the dependence chain hence gives diminishing returns.

In an embodiment, the chain of instructions feeding into a given delinquent load/H2P branch can be determined at run-time, e.g., using an out-of-order scheduler. The scheduler tracks the micro-ops that create the source registers for a given micro-op. First the micro-ops that create the source for a target load/branch are recorded. Then via a learning process, it is determined whether these micro-ops are value predictable. Once a value prediction is made, there is no need to iterate any further. However if a given feeder micro-op is not value predictable, then an iterative learning process occurs to determine if micro-ops feeding into this feeder micro-op are predictable. Iteratively, a list of micro-ops that lie on the feeder chain of the delinquent load/H2P branch that are value predictable can be determined.

In the example of FIG. 6, if L2 is predictable, it will not look beyond L2. If L3, though, is not predictable, it will continue to search L3's sources until it finds a predictable instruction. Note that in a case of multiple sources, there may be more than one micro-op that is to be value predicted. Through this process, ultimately only a small fraction of the feeder chain is value predicted (preferably as close as possible to the target H2P branch or delinquent load). This reduces the table size for value prediction, and can subsequently help use more complex value prediction algorithms for these subset of instruction.

Embodiments specifically target delinquent loads and H2P branches that account for most of the stalls in a pipeline, and use the OOO scheduler to iteratively find out the minimum set of micro-ops to be predicted to speed up the feeder chain.

When a delinquent load/H2P branch is allocated to a scheduler, a backslice detector may extract the immediate sources of the instruction. These sources and the critical load/branch itself may be recorded in entries of the value prediction table. Each entry in the value prediction table has a confidence associated with the predictability of the IP. The higher the confidence value, the lower are the chances of mis-predictions.

When any recorded instruction performs a write-back, i.e., after completion of execution, its confidence is updated according to whether the prediction is correct or wrong. Once a sufficient confidence level has been reached, value prediction can be performed for the load IP. This period when the confidence and predictability is being learned is a training phase.

In the training phase, if any instruction is seen to not be predictable for a long time where there is low confidence in the prediction, it is discarded and the backslice detector extracts the sources of this instruction. These new sources are then tracked and the training phase occurs for these instructions. The process keeps repeating until the nearest predictable instruction in the dependence chain is obtained.

Once the training phase expires (such as based on at least a predetermined level of the confidence value), it is known which IP's are predictable and which are not. The IP's which are found predictable enter a prediction phase. In the prediction phase, when a new instance of the IP enters the instruction decode queue, a lookup is performed using the IP in the value prediction table. As the IP has high confidence, a prediction is performed for this instruction. Any IPs that are not predictable are removed from the value prediction table and will not be predicted any more. This ensures that the minimum set of instructions on the backslice are accelerated and the risk of mis-prediction is also reduced.

In the prediction phase, the prediction is validated on write-back. The predicted value is compared with the actual value after the load executes. On a mis-prediction, the pipeline is restarted from the mis-predicted instruction and the confidence for that IP is decreased. Otherwise, normal execution continues, and the confidence continues to build up.

Figure 7:
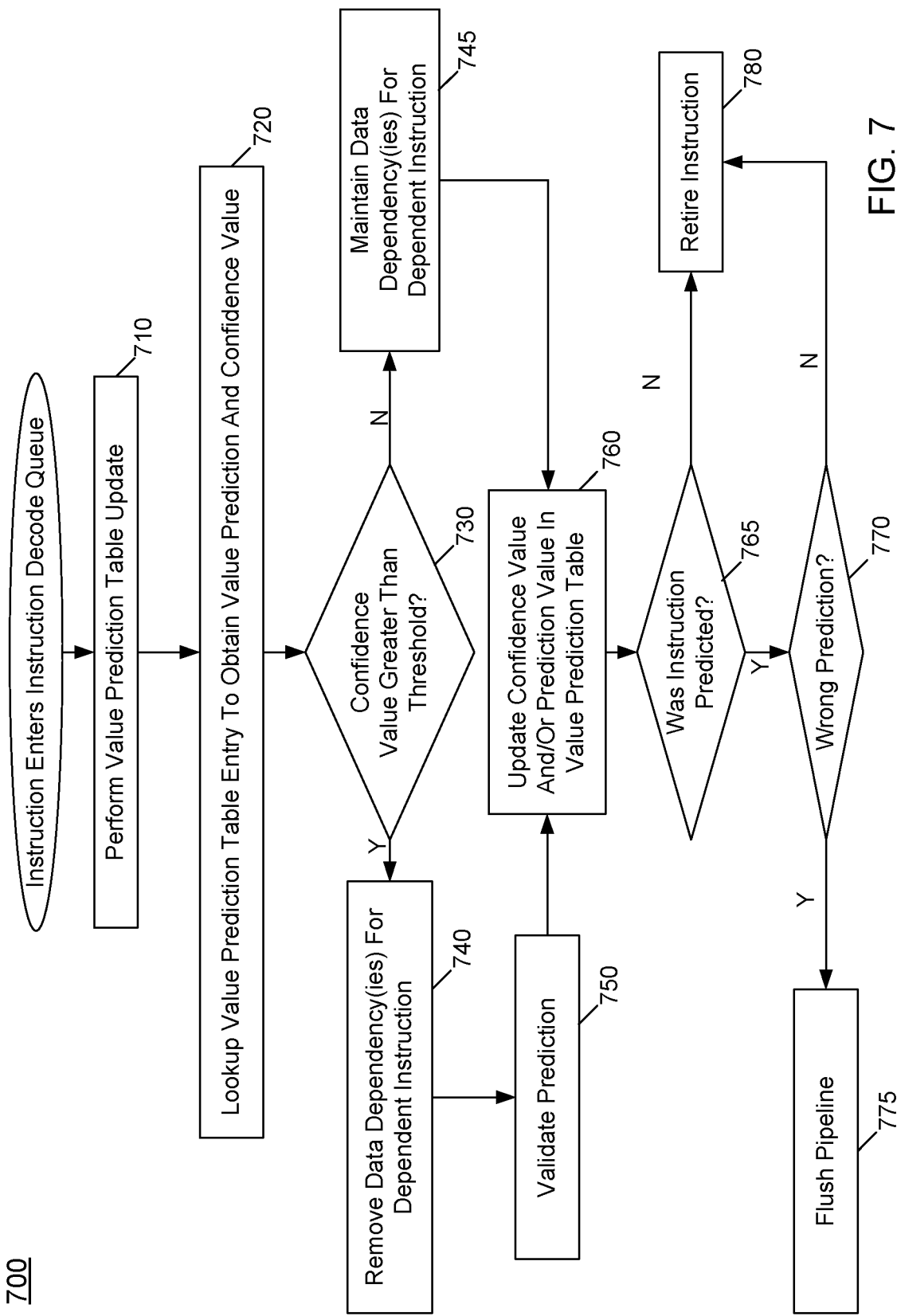
FIG. 7 is a flow diagram of a method in accordance with an embodiment of the present invention.

Referring now to FIG. 7, shown is a flow diagram of a method in accordance with an embodiment of the present invention. As shown in FIG. 7, method 700 is a method for using information in a value predictor to improve processor performance for execution of certain dependent instructions. In embodiments, method 700 may be performed by hardware circuitry, firmware, software and/or combinations thereof. In one particular embodiment, method 700 may be performed in part by control circuitry associated with a value predictor, along with other control circuitry within scheduling and other portions of a processor.

As shown, method 700 begins upon receipt of an instruction in an instruction decode queue or other front end unit. More specifically, this instruction may be received by way of a micro-instruction (uop). With an instruction pointer of this instruction, an update to the valid prediction table may occur (block 710), to identify whether this instruction hits or misses in the table. Note that if the instruction misses, no further operations occur in method 700.

When it is determined that the instruction hits, a lookup may be performed to obtain a value prediction and a confidence value associated with this instruction (block 720). Next it is determined whether the confidence value exceeds a threshold (diamond 730). Although the scope of the present invention is not limited in this regard, in an embodiment with a four-bit counter, the threshold may be set at a level of zero, thus indicating a relatively high level of confidence that the value prediction for this instruction is likely accurate.

In this instance when it is determined that the confidence value exceeds the threshold, the value prediction may thus be used in execution of the dependent instruction. As such, control passes to block 740 where at least one data dependency for the dependent instruction may be removed. For example, a source operand for the dependent instruction resulting from this value predicted instruction may be marked as not dependent such that the dependent instruction is or may be ready for execution. As such the dependent instruction can be executed speculatively, at a time earlier than it would have if it waited for commit/retirement of its feeder instructions, and thus the value prediction is put in the reservation station for the source operand.

FIG. 7 further shows update operations to be performed after execution of the value predicted instruction. More specifically as illustrated at block 750 a determination may be made as to whether the value predicted instruction was correctly predicted. In other words, it is determined whether the value predicted instruction as executed resulted in the same result as the value prediction. At block 760, data and/or confidence information in the corresponding entry of the value prediction table may be updated based on this value prediction. Here, assuming that the result of the value predicted instruction was correctly predicted by way of the value prediction, the confidence value may be updated (e.g., incremented) if it is not already saturated. Otherwise, if there was a misprediction, in that the value predicted instruction result does not match the value prediction, the confidence value may be decremented.

Still with reference to FIG. 7, next it is determined at diamond 765 whether the instruction, namely the value predicted instruction, was predicted. If the instruction was predicted, control passes to diamond 770 to determine whether the prediction was correct or incorrect. If it is determined that the prediction was incorrect, control passes to block 775 where the pipeline may be flushed to remove this instruction and dependent instructions, thus restoring context back to a correct known state. In an embodiment, a nuke operation may be performed to flush the pipeline. Otherwise, if the prediction was correct, a normal retirement of the instruction may occur (block 780).

Still with reference to FIG. 7, if at diamond 730 it is determined that the confidence value does not exceed the threshold, e.g., because the value prediction has not been fully learned or one or more recent mispredictions have occurred, control instead passes to block 745, where data dependencies for the dependent instruction are not removed. As such, this dependent instruction is not allowed to be marked as ready for execution until the value predicted instruction is actually executed. Note that in this instance, assuming a training process is undergoing for this instruction, after its execution confidence information may be updated, e.g., by comparison of the executed result to the value prediction such that the confidence value can be incremented if the value prediction agrees with the executed result (and vice-versa). Understand while shown at this high level in the embodiment of FIG. 7, many variations and alternatives are possible.

Figure 8:
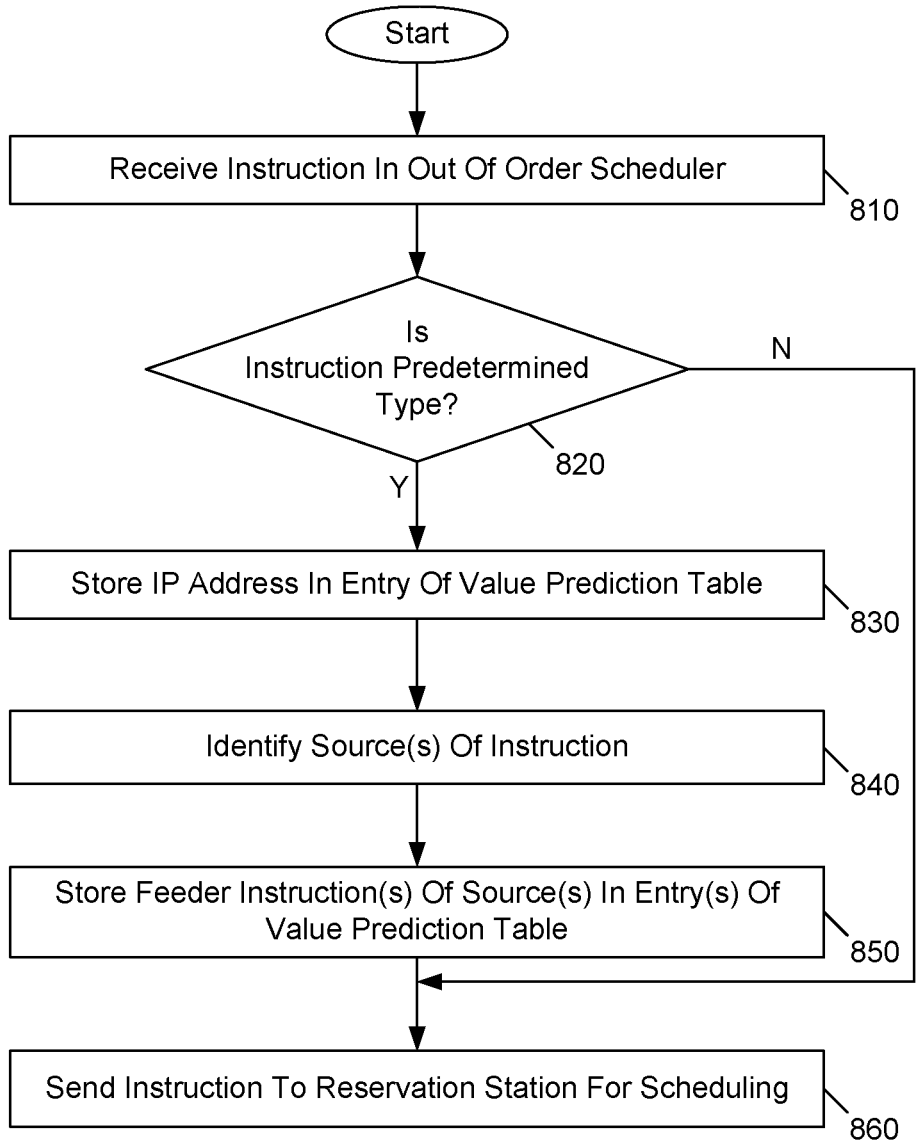
FIG. 8 is a flow diagram of a method in accordance with another embodiment of the present invention.

Referring now to FIG. 8, shown is a flow diagram of a method in accordance with yet another embodiment of the present invention. More specifically as shown in FIG. 8, method 800 is a method for allocating entries within a value prediction table. In embodiments, method 800 may be performed by hardware circuitry, firmware, software and/or combinations thereof. In one particular embodiment, method 800 may be performed in part by control circuitry associated with a value predictor.

As illustrated, method 800 begins by receiving an instruction in an out-of-order scheduler such as a reservation station (block 810). Then it is determined whether the instruction is of a predetermined type (diamond 820). Note that as used herein, predetermined instruction types are those that are appropriate for value prediction, owing to their potential adverse impact on instruction execution due to a lack of prediction and/or presence in a cache hierarchy. If it is determined that an instruction is of a predetermined type (e.g., a load instruction that misses deep in the pipeline or an H2P instruction), control passes to block 830 where an IP address for this instruction of the predetermined type may be stored in an entry of the value prediction table. Note that more specifically, at least a portion of the IP address of the instruction is stored in an address field of a given entry. At this point, no information is stored in a value prediction field or a confidence value field for this newly allocated instruction.

Next, at block 840 a source or sources of this instruction may be identified. For example, reference may be made using the source operands of the instruction to identify their feeder instructions. These feeder instructions themselves may be stored in entries of the value prediction table (block 850). As discussed above, the IP addresses of these feeder instructions may be stored, but no data or confidence information is stored at this allocation point. Instead during a learning phase, such information may be stored and updated based on multiple executions of such instructions. Finally with reference to FIG. 8, at block 860 the instruction is sent to the reservation station for scheduling. In this instance where there are not appropriate value predictions for this instruction or its feeder instructions, the instruction will be marked as dependent until its feeder instructions properly execute to provide the sources for the instruction. Understand while shown at this high level in the embodiment of FIG. 8, many variations and alternatives are possible.

Figure 9:
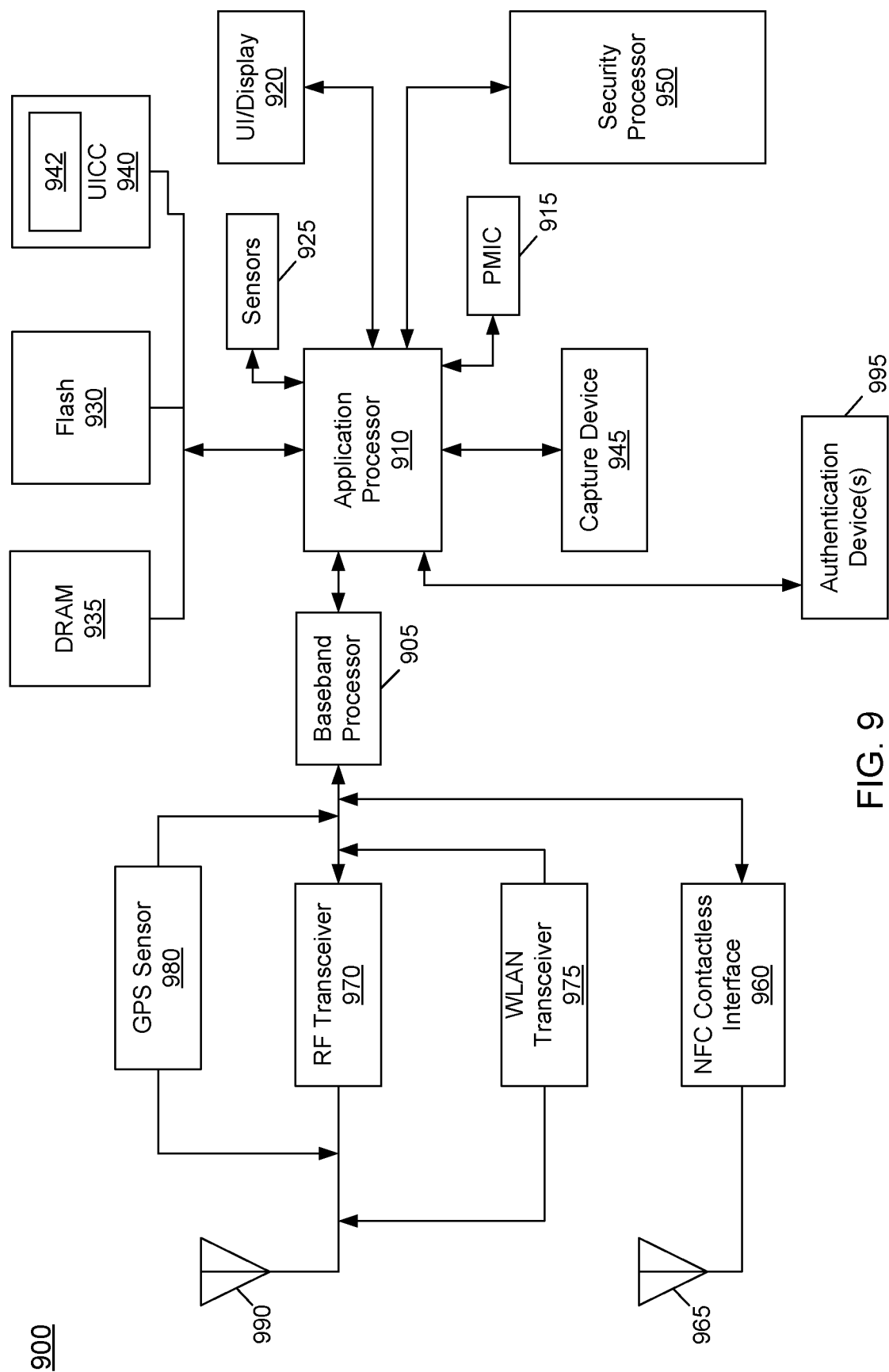
FIG. 9 is a block diagram of an example system with which embodiments can be used.

Embodiments may be implemented in many different system types, ranging from small portable devices to large server systems and device types in between. Referring now to FIG. 9, shown is a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia applications. Application processor 910 may further be configured to perform a variety of other computing operations for the device. In embodiments, application processor 910 may include a value predictor as described herein. More specifically, the value predictor may be used to provide value predictions for focused dependent instructions and one or more feeder instructions of these focused dependent instructions, to enable earlier speculative execution of these dependent instructions, as described herein.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. As further seen, application processor 910 also couples to a capture device 945 such as one or more image capture devices that can record video and/or still images.

Still referring to FIG. 9, a universal integrated circuit card (UICC) 940 comprises a subscriber identity module, which in some embodiments includes a secure storage 942 to store secure user information. System 900 may further include a security processor 950 that may implement a trusted executed environment (TEE), and which may couple to application processor 910.

A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations. As further illustrated, a near field communication (NFC) contactless interface 960 is provided that communicates in a NFC near field via an NFC antenna 965. While separate antennae are shown in FIG. 9, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more wireless networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 10:
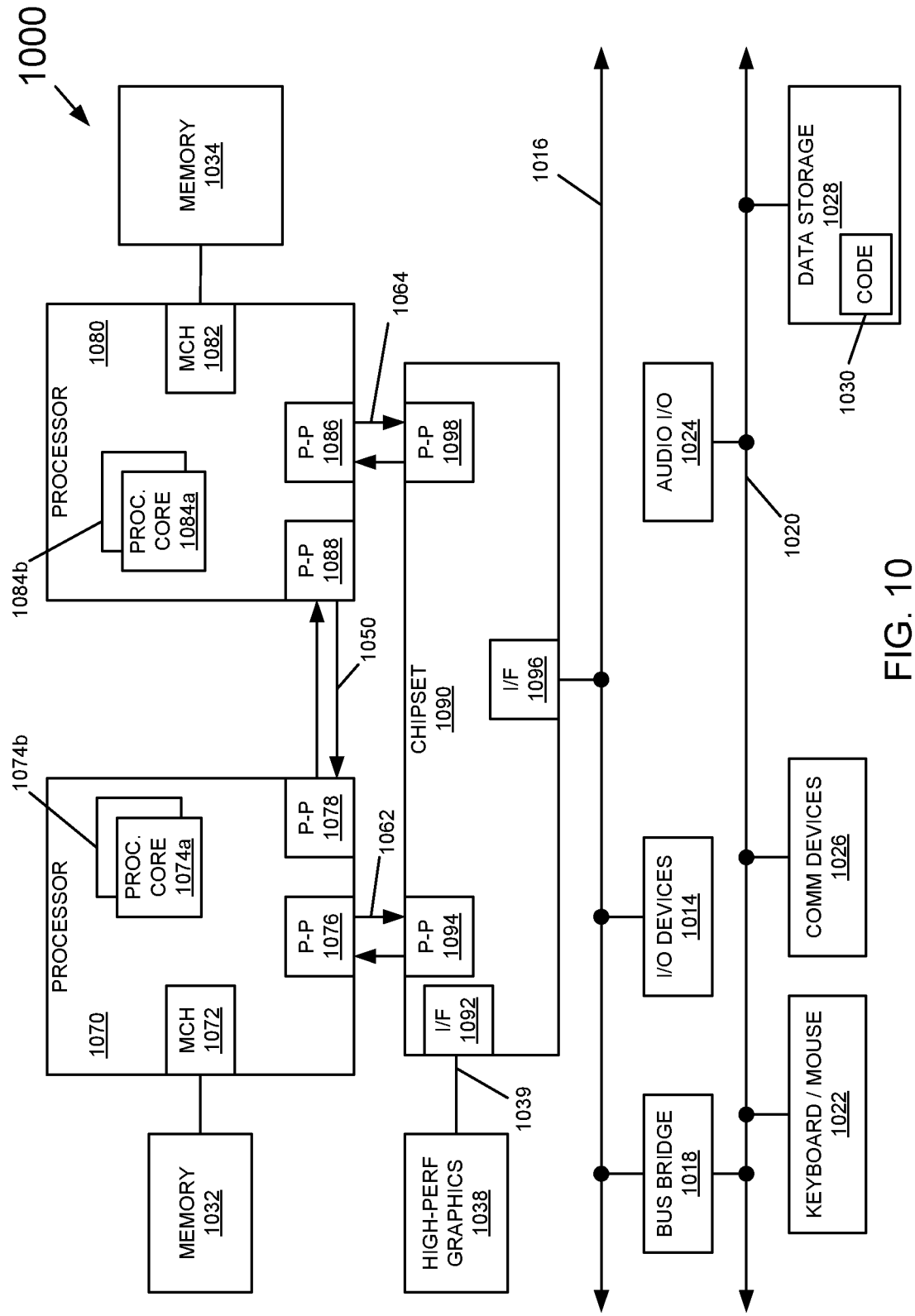
FIG. 10 is a block diagram of a system in accordance with another embodiment of the present invention.

Referring now to FIG. 10, shown is a block diagram of a system in accordance with another embodiment of the present invention. As shown in FIG. 10, multiprocessor system 1000 is a point-to-point interconnect system such as a server system, and includes a first processor 1070 and a second processor 1080 coupled via a point-to-point interconnect 1050. As shown in FIG. 10, each of processors 1070 and 1080 may be multicore processors such as SoCs, including first and second processor cores (i.e., processor cores 1074a and 1074b and processor cores 1084a and 1084b), although potentially many more cores may be present in the processors. The various processor cores of processors 1070 and 1080 may include value predictors as described herein. More specifically, the value predictors may be used to provide value predictions for focused dependent instructions and one or more feeder instructions of these focused dependent instructions, to enable earlier speculative execution of these dependent instructions, as described herein.

Still referring to FIG. 10, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 10, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020. Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
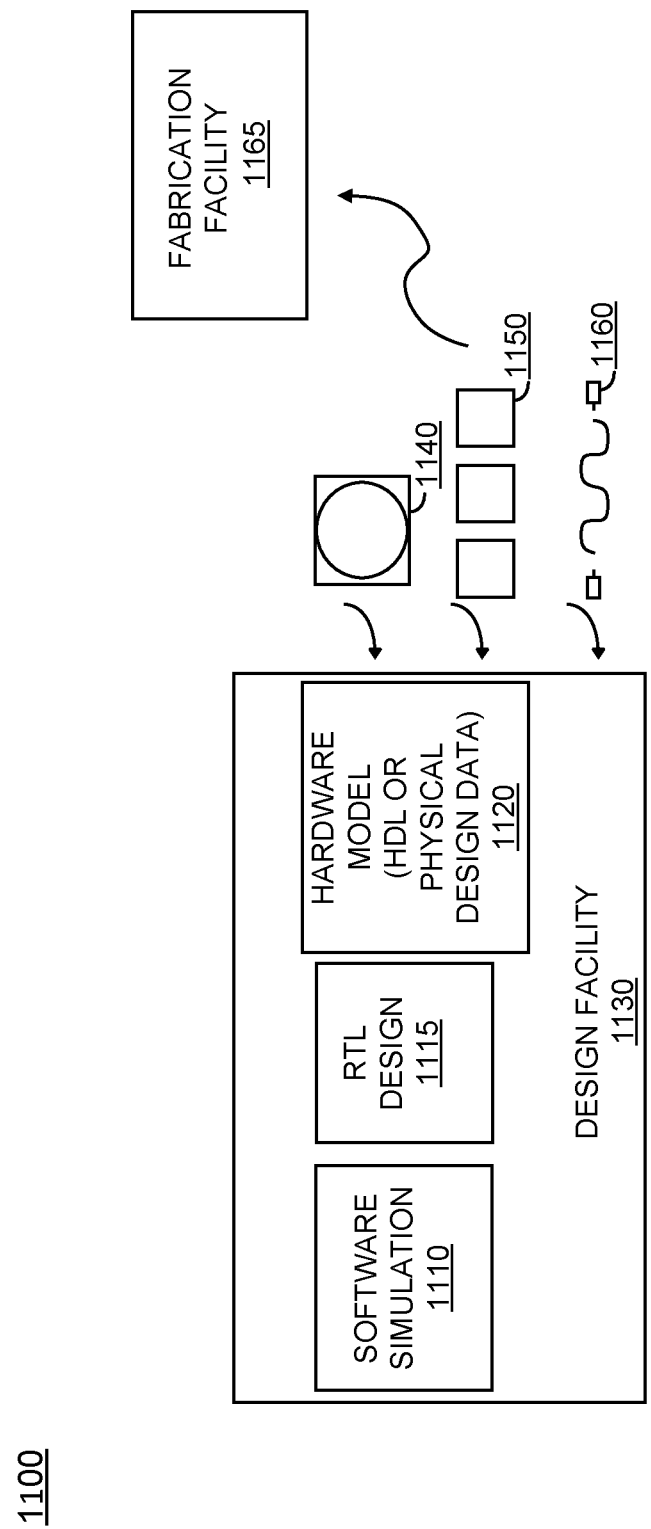
FIG. 11 is a block diagram illustrating an IP core development system used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SoC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a third party fabrication facility 1165 using non-volatile memory 1140 (e.g., hard disk, flash memory, or any non-volatile storage medium). Alternately, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

The following examples pertain to further embodiments.

In one example, an apparatus comprises: a value prediction storage including a plurality of entries each to store address information of an instruction, a value prediction for the instruction and a confidence value for the value prediction; and a control circuit coupled to the value prediction storage, where, in response to an instruction address of a first instruction, the control circuit is to access a first entry of the value prediction storage to obtain a first value prediction associated with the first instruction and control execution of a second instruction based at least in part on the first value prediction, the first instruction comprising a feeder instruction for the second instruction and the second instruction comprising a load instruction expected to miss in a cache hierarchy.

In an example, the control circuit is to determine a source address for the load instruction based at least in part on the first value prediction.

In an example, the apparatus further comprises an execution unit to cause the load instruction to execute to obtain data stored at the source address.

In an example, after execution of the first instruction, the control circuit is to compare a result of the first instruction to the first value prediction, and update a first confidence value of the first entry in a first direction in response to the result matching the first value prediction and update the first confidence value in a second direction in response to the result not matching the first value prediction.

In an example, for the first direction, the control circuit is to increment the first confidence value by a first constant and, for the second direction, to decrement the first confidence value by a second constant, the first constant different than the second constant.

In an example, the control circuit is to enable the load instruction to speculatively execute using the first value prediction when a first confidence value of the first entry exceeds a threshold value.

In an example, the apparatus further comprises a reservation station to mark a first source operand of the load instruction as ready when a first confidence value of the first entry exceeds a threshold value.

In an example, the control circuit is to allocate a third instruction to the value prediction table when it is determined that the first instruction is not value predictable, the third instruction comprising a feeder instruction for the first instruction.

In an example, the control circuit, in response to an instruction address of a third instruction, is to access a third entry of the value prediction storage to obtain a third value prediction associated with the third instruction and control execution of a fourth instruction based at least in part on the third value prediction, the third instruction comprising a feeder instruction for the fourth instruction, the fourth instruction having a history of misprediction.

In another example, a method comprises: obtaining, from a value prediction table of a processor, a value prediction and a confidence value for a first instruction; in response to the confidence value for the first instruction exceeding a threshold value, enabling a second instruction dependent on the first instruction to be speculatively executed using the value prediction for the first instruction; and in response to determining that the first instruction is not value predictable, allocating a third instruction into the value prediction table, the third instruction comprising a feeder instruction for the first instruction.

In an example, the method further comprises, in response to the confidence value for the first instruction being less than the threshold value, preventing the second instruction from executing until after the first instruction executes.

In an example, the method further comprises after executing the first instruction, updating at least one of the value prediction and the confidence value for the first instruction based upon a result of the first instruction.

In an example, the method further comprises, in response to identifying a mis-prediction for the first instruction based on the result of the first instruction, updating the confidence value for the first instruction in a second direction and flushing at least a portion of a pipeline of the processor.

In an example, the method further comprises allocating the first instruction in the value prediction table in response to identifying the second instruction as a delinquent load instruction or a hard-to-predict instruction.

In an example, the method further comprises identifying the second instruction as the delinquent load instruction in response to performance monitoring information from a performance monitor of the processor.

In an example, the method further comprises: obtaining, from the value prediction table, a third value prediction and a third confidence value for the third instruction; and in response to the third confidence value for the third instruction exceeding the threshold value, enabling the first instruction to be speculatively executed using the third value prediction for the third instruction.

In an example, the method further comprises, in response to the confidence value for the first instruction exceeding the threshold value, removing at least one data dependency of the second instruction to enable the speculative execution of the second instruction.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises a processor having at least one core. The at least one core comprises: a value prediction storage including a plurality of entries each to store address information of an instruction, a value prediction for the instruction and a confidence value for the value prediction; a control circuit coupled to the value prediction storage, where, in response to an identification of a second instruction comprising a feeder instruction for a first instruction, the control circuit is to allocate a second entry in the value prediction storage for the second instruction and in response to a determination that the second instruction is not value predictable, allocate a third entry in the value prediction storage for a third instruction comprising a feeder instruction for the second instruction; and a scheduler coupled to the control circuit, where in response to a third confidence value for the third instruction that exceeds a threshold, the scheduler is to cause the second instruction to execute using a third value prediction for the third instruction. The system may further include a system memory coupled to the processor.

In an example, the scheduler is to remove one or more data dependencies of the second instruction in response to the third confidence value for the third instruction that exceeds the threshold, to enable the second instruction to execute using the third value prediction.

In an example, after execution of the third instruction, the control circuit is to compare a result of the third instruction to the third value prediction, and update the third confidence value in response to the comparison.

Understand that various combinations of the above examples are possible.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a value prediction storage including a plurality of entries each to store address information of an instruction, a value prediction for the instruction and a confidence value for the value prediction; and
a control circuit coupled to the value prediction storage, wherein, in response to an instruction address of a first instruction, the control circuit is to access a first entry of the value prediction storage to obtain a first value prediction associated with the first instruction and control execution of a second instruction based at least in part on the first value prediction, the first instruction comprising a feeder instruction for the second instruction and the second instruction comprising a load instruction.

2. The apparatus of claim 1, wherein the control circuit is to determine a source address for the load instruction based at least in part on the first value prediction.

3. The apparatus of claim 2, further comprising an execution unit to cause the load instruction to execute to obtain data stored at the source address.

4. The apparatus of claim 1, wherein, after execution of the first instruction, the control circuit is to compare a result of the first instruction to the first value prediction, and update a first confidence value of the first entry in a first direction in response to the result matching the first value prediction and update the first confidence value in a second direction in response to the result not matching the first value prediction.

5. The apparatus of claim 4, wherein, for the first direction, the control circuit is to increment the first confidence value by a first constant and, for the second direction, to decrement the first confidence value by a second constant, the first constant different than the second constant.

6. The apparatus of claim 1, wherein the control circuit is to enable the load instruction to speculatively execute using the first value prediction when a first confidence value of the first entry exceeds a threshold value.

7. The apparatus of claim 1, further comprising a reservation station to mark a first source operand of the load instruction as ready when a first confidence value of the first entry exceeds a threshold value.

8. The apparatus of claim 1, wherein the control circuit is to allocate a third instruction to the value prediction storage when it is determined that the first instruction is not value predictable, the third instruction comprising a feeder instruction for the first instruction.

9. The apparatus of claim 1, wherein the control circuit, in response to an instruction address of a third instruction, is to access a third entry of the value prediction storage to obtain a third value prediction associated with the third instruction and control execution of a fourth instruction based at least in part on the third value prediction, the third instruction comprising a feeder instruction for the fourth instruction, the fourth instruction having a history of misprediction.

10. At least one non-transitory computer readable storage medium having stored thereon instructions, which if performed by a machine cause the machine to perform a method comprising:
   obtaining, from a value prediction table of a processor, a value prediction and a confidence value for a first instruction;
   in response to the confidence value for the first instruction exceeding a threshold value, enabling a second instruction dependent on the first instruction to be speculatively executed using the value prediction for the first instruction; and
   in response to determining that the first instruction is not value predictable, allocating a third instruction into the value prediction table, the third instruction comprising a feeder instruction for the first instruction.

11. The at least one non-transitory computer readable storage medium of claim 10, wherein the method further comprises, in response to the confidence value for the first instruction being less than the threshold value, preventing the second instruction from executing until after the first instruction executes.

12. The at least one non-transitory computer readable storage medium of claim 10, wherein the method further comprises after executing the first instruction, updating at least one of the value prediction and the confidence value for the first instruction based upon a result of the first instruction.

13. The at least one non-transitory computer readable storage medium of claim 12, wherein the method further comprises, in response to identifying a mis-prediction for the first instruction based on the result of the first instruction, updating the confidence value for the first instruction in a second direction and flushing at least a portion of a pipeline of the processor.

14. The at least one non-transitory computer readable storage medium of claim 10, wherein the method further comprises allocating the first instruction in the value prediction table in response to identifying the second instruction as a delinquent load instruction or a hard-to-predict instruction.

15. The at least one non-transitory computer readable storage medium of claim 14, wherein the method further comprises identifying the second instruction as the delinquent load instruction in response to performance monitoring information from a performance monitor of the processor.

16. The at least one non-transitory computer readable storage medium of claim 10, wherein the method further comprises:
   obtaining, from the value prediction table, a third value prediction and a third confidence value for the third instruction; and
   in response to the third confidence value for the third instruction exceeding the threshold value, enabling the first instruction to be speculatively executed using the third value prediction for the third instruction.

17. The at least one non-transitory computer readable storage medium of claim 10, wherein the method further comprises, in response to the confidence value for the first instruction exceeding the threshold value, removing at least one data dependency of the second instruction to enable the speculative execution of the second instruction.

18. A system comprising:
   a processor having at least one core, the at least one core comprising:
      a value prediction storage including a plurality of entries each to store address information of an instruction, a value prediction for the instruction and a confidence value for the value prediction;
      a control circuit coupled to the value prediction storage, wherein, in response to an identification of a second instruction comprising a feeder instruction for a first instruction, the control circuit is to allocate a second entry in the value prediction storage for the second instruction and in response to a determination that the second instruction is not value predictable, allocate a third entry in the value prediction storage for a third instruction comprising a feeder instruction for the second instruction; and
      a scheduler coupled to the control circuit, wherein in response to a third confidence value for the third instruction that exceeds a threshold, the scheduler is to cause the second instruction to execute using a third value prediction for the third instruction; and
   a system memory coupled to the processor.

19. The system of claim 18, wherein the scheduler is to remove one or more data dependencies of the second instruction in response to the third confidence value for the third instruction that exceeds the threshold, to enable the second instruction to execute using the third value prediction.

20. The system of claim 18, wherein, after execution of the third instruction, the control circuit is to compare a result of the third instruction to the third value prediction, and update the third confidence value in response to the comparison.

* * * * *